Figure 1:
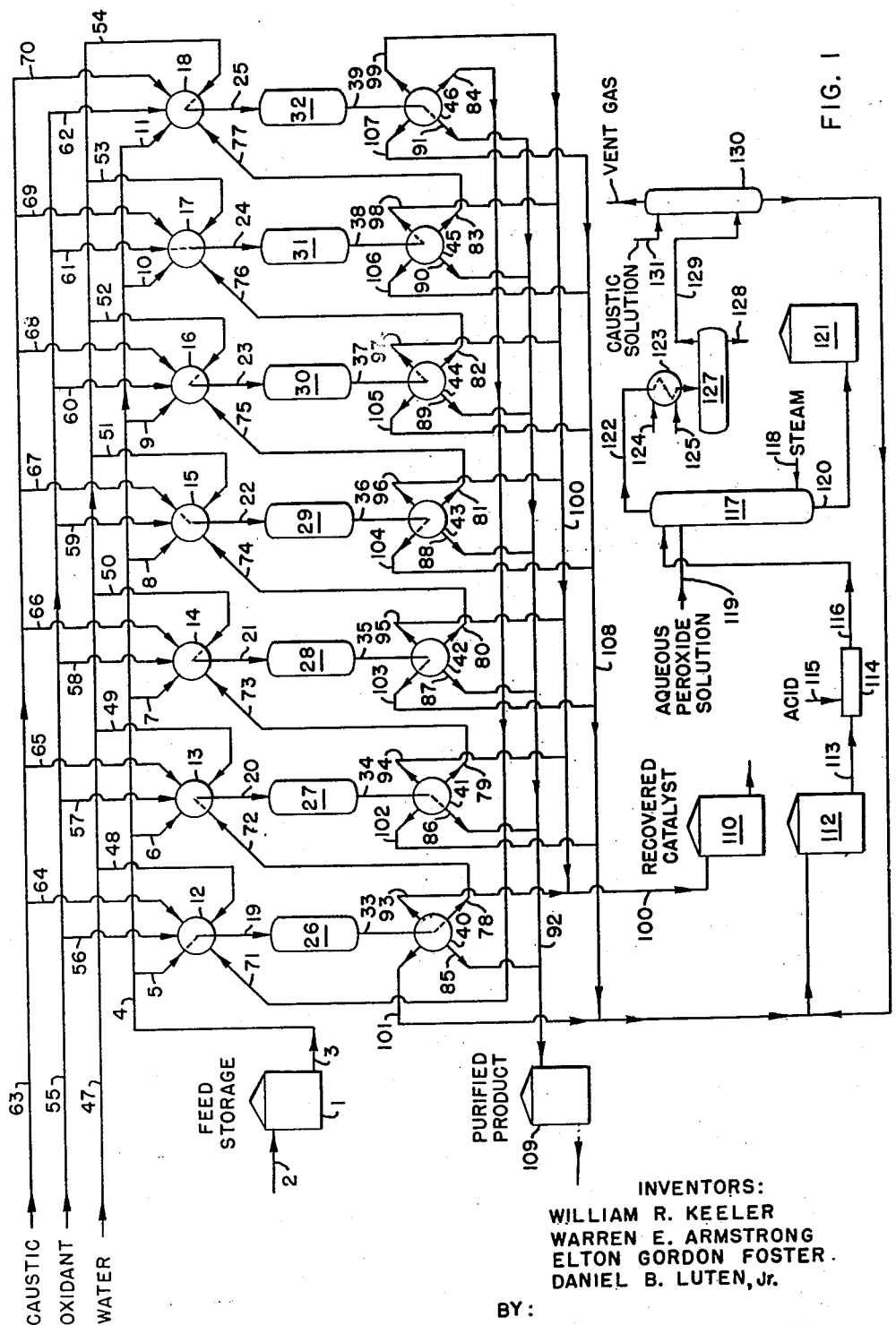

INVENTORS:
WILLIAM R. KEELER
WARREN E. ARMSTRONG
ELTON GORDON FOSTER
DANIEL B. LUTEN, Jr.

BY:
THEIR ATTORNEY

United States Patent Office 2,813,130
Patented Nov. 12, 1957

2,813,130

RECOVERY OF OSMIUM COMPOUNDS BY ADSORPTION ON ALUMINA

William R. Keeler, Manhattan Beach, and Daniel B. Luten, Jr., Berkeley, Calif., assignors to Shell Development Company, New York, N. Y., a corporation of Delaware Application September 13, 1954, Serial No. 455,714

9 Claims. (Cl. 260—635)

This invention relates to reactions of organic compounds carried out with or in the presence of osmium compounds. It deals with a method whereby the osmium values can be recovered efficiently and economically from organic matter containing the same.

Osmium, especially in the form of osmium tetroxide, is known to be highly advantageous as a catalyst or reactant in many organic chemical reactions. It has been used in the synthesis of cortisone and for promoting hydroxylation of olefinic compounds and other oxidations of organic materials, as discussed in H. Gilman's "Organic Chemistry, An Advanced Treatise," vol. IV, chapter 12, by W. A. Waters (J. Wiley and Sons, New York, 1953), especially pages 1180 to 1184. Most of the work on organic reactions involving osmium compounds has been on a very small laboratory scale because the relative scarcity of the metal makes its cost very high. Large scale organic reactions involving the use of osmium are economically feasible only for the production of expensive products unless a high recovery of the osmium, not heretofore commercially practical, can be consistently achieved. The importance of this recovery problem has been recognized and several solutions have been proposed, but all involve disadvantages.

It is an object of the present invention to provide a practical method for efficiently separating osmium from organic material. Another object is the recovery of osmium from organic material in a simple, economical manner. A further object is to free organic material from admixed osmium compounds without damage to, or loss of, valuable organic product present. A special object is the recovery of osmium catalyst from hydroxylation products in a form suitable for recycle to the process. Still other objects and advantages of the new process will be apparent from the following description of the invention.

The chemistry of osmium is quite complex due to the variety of valence states in which osmium can exist, and in spite of considerable work on the subject much remains to be learned of the behavior of osmium compounds under various conditions. Knowledge of the organic chemistry of osmium is especially inadequate. Many coordinate compounds and addition complexes involving osmium in one of its several valence states are known to exist but the nature of most of them has not been elucidated. In aqueous organic systems in particular the osmium exists as complexes whose exact nature is unknown. Even the accurate determination of small amounts of osmium in such systems by chemical methods is not always feasible. By the use of radioactive osmium and the tracer technique, we have found that precise measurement of exceedingly small amounts of osmium in aqueous organic media is possible. Using this method of determining the osmium, we have been able to accurately determine the efficiency of osmium recovery systems for the first time.

The invention is based upon the unexpected discovery that the osmium compounds of the form present in aqueous organic crude oxidation products can be absorbed efficiently on adsorptive alumina. This is contrary to what would have been predicted in view of the fact that neither osmium tetroxide or osmium dioxide can be so adsorbed, these oxides being the forms in which the osmium has heretofore been assumed to be present in oxidation products prepared in the presence of osmium compounds. It may be that the osmium is present in these mixtures at least in part in the form of organic complexes of unknown and probably variable nature and that it is these compounds which are responsible for the effective adsorption. It is possible that the presence of the organic components of oxidation mixtures formed in the presence of osmium promotes the adsorption. Still other explanations of the observed facts are possible but the invention is not dependent upon the mechanism of the adsorption which is involved. Apparently in most cases the osmium is present in forms which differ in their ease of adsorption on alumina. However that may be, it has been found that efficient recoveries can be achieved from mixtures which contain organic compounds which stabilize the osmium compounds present therein against reduction to the dioxide. Compounds of this type are, for instance, polyhydroxy alcohols, hydroxy acids such as glycolic acid, polyhydroxy aldehydes, etc., and, in general, the products of oxidation of ethylenic compounds formed in reactions with oxidized osmium compounds are effective in preventing this reduction to the dioxide when present in excess of the osmium compound. The process is carried out by first contacting the organic material-containing mixture from which the osmium compound is to be removed with an adsorptive alumina so as to provide intimate contact with the alumina whereby adsorption of the osmium compound or compounds present on the alumina is effected. After adsorption of the desired amount of osmium, the alumina is removed from the mixture. The osmium can then be separated from the alumina by washing with a suitable medium and the alumina reused in the process.

Any adsorptive alumina can be used in the process. Aluminas having a porosity greater than 30% on a void-free basis are preferred, and most preferably aluminas having a porosity between about 50% and about 70% are used. Porosity, as used herein, refers to interstices or pores of a diameter less than 0.03 millimeters, this being the usual way of defining the porosity of solids. As a rule, it is advantageous to use aluminas having an average pore diameter of about 25 to 250 Angstrom units and a surface area of about 50 to 500 square meters per gram. The manufacture of one suitable type of adsorptive alumina is described in U. S. Patent 1,868,869, for example. A number of adsorptive aluminas meeting the requirements are available, for instance, Alorco Grades F–1, F–20 and H–40 manufactured by the Aluminum Company of America, Harshaw aluminas grades A, A1–0104 and A1–0501, etc. The alumina is advantageously used in the form of particles of about 4 to 250 mesh size. For use in adsorption beds it is preferred to use alumina of about 40 to about 80 mesh as this provides a low pressure drop in the beds with sufficient surface for efficient adsorption.

The alumina can be contacted with the reaction mixture in various ways. For example, the reaction mixture containing the osmium compound or compounds to be recovered, together with the organic material present therewith, can be percolated through one or more beds of activated alumina at a rate controlled so as to provide a sufficient time of contact for the desired adsorption of the osmium compounds. Reaction mixture practically free from osmium can be withdrawn continuously or intermittently from contact with the alumina adsorption bed or beds.

Alternatively, the activated alumina can be added with stirring to the reaction mixture and, after the desired adsorption has taken place, removed by filtration or decantation. In this modification of the process it is usually desirable to use an amount of alumina equal to about 2% to about 10% by weight of the reaction mixture which is being treated. Larger or smaller amounts of alumina can, however, be used depending upon the osmium content of the reaction mixture involved. With viscous reaction mixtures it may be desirable to add water or other suitable solvent to promote adequate contact with the adsorptive alumina and facilitate its subsequent separation.

The treatment of the osmium compound-containing organic reaction product with alumina can usually be advantageously carried out at ordinary temperatures. Under some circumstances, however, higher or lower temperatures may be desirable, generally, temperatures within the range of about $-10°$ C. to about $200°$ C. are most suitable.

The osmium compound or compounds thus removed from the reaction mixture can be recovered from the alumina on which they are adsorbed in various ways. It is generally desirable to first wash the osmium compound-containing alumina with a suitable solvent to remove any valuable organic reaction product which may adhere to the alumina. Water is a useful solvent for such washing in the case of water-soluble hydroxylation products, for example.

Several different methods are available for extracting the adsorbed osmium compounds from the alumina. The most efficient extracting agents are solutions of oxidizing agents capable of converting the osmium to the tetroxide because in this form the osmium compound is not adsorbed on alumina. With solutions of this type effective removal of osmium can be achieved without the use of excessive volumes of solution which increase the cost of recovery of the osmium from the extract. Among the most effective oxidizing solutions are hydrogen peroxide, ceric ($Ce^{IV}$) salts in dilute acid, e. g. sulfuric, perchloric, nitric or the like inorganic acids, and permanganates ($MnO_4^-$) or hypochlorites ($OCl^-$) in dilute alkali solution, for instance, sodium, potassium, barium or tetramethylammonium hydroxide solutions. Solutions containing about 0.01% to about 5% of oxidizing agent in aqueous solutions containing about 0.1% to about 10% of acid or base are generally suitable. Solutions containing about 0.05% to about 0.2% of tetravalent cerium in aqueous acid of about 1% to about 3% concentration or about 0.05% to about 0.2% of permanganate in aqueous base of about 1% to about 3% concentration are the preferred oxidizing solvents for use in the process.

Alternatively, the adsorbed osmium compounds can be extracted from the alumina by washing with a solution of an alkaline agent which converts the osmium to salts of complex organic osmium acids. Sodium or other alkali metal hydroxide solutions are advantageous extraction agents of this type. Such solutions are preferably used in concentrations of about 0.5% to about 5%. Dilute acids such, for instance, as sulfuric acid, which may be presumed to repress ionization of the complex organic osmium acids, can likewise be used for removing the adsorbed osmium compounds from the alumina.

Where the alumina is to be used again in the process it is not essential that all the osmium compound or compounds present therein be removed. It is generally desirable, however, to remove sufficient of the osmium so that an excessive investment is not involved in the osmium thus retained by the alumina. Since it is usually advantageous to wash the extracted alumina to remove therefrom the osmium-extracting agent before reusing the alumina for further adsorption of osmium compounds from the osmium-containing organic material being treated, it is usually desirable to carry the initial extraction of the osmium compound from the alumina at least to the point where large amounts of osmium will not be removed in the washing operation. While any osmium so removed in the washing liquor can, of course, be recovered and reused, the increased volume of liquids which have to be handled under such circumstances increases the cost of recovery and is preferably avoided. Usually 90%–99% or more of the absorbed osmium compounds are rapidly and easily removed by the beforementioned oxidative extracting agents. Although residual osmium is thus left on the alumina after each cycle, an equilibrium is soon reached and there is no build-up of osmium on the adsorbent.

The extracted osmium compound or compounds can be recovered from the extracting solution or solutions in a form suitable for recycle to the original process by a number of different methods of treatment. Depending upon the type of extractant employed, the extracted osmium will be present as the tetroxide and/or in non-volatile, lower valence form, for instance, as salts or complexes. Generally, some of the lower valence forms will be less suitable in the original process in which the osmium was used as catalyst or reactant.

For complete recovery of the osmium in a form suitable for reuse as a completely effective catalyst, it is necessary to oxidize the extracted osmium compounds to volatile osmium tetroxide, in order to free the osmium compounds from acids, bases and salts which would interfere in either the original reaction or in adsorption on alumina during the next recovery treatment, and to convert the fraction of the lower valence forms which probably are non-catalytic to osmium tetroxide. One method of accomplishing this is acidification of the extract and treatment with hydrogen peroxide, or more preferably a soluble permanganate, for instance, potassium permanganate, or with chlorine, followed by distillation of the volatile osmium tetroxide.

The method of removing osmium compounds as described hereinbefore provides a workable process which can be successfully used in a variety of situations, but, for the highest recovery of osmium compounds, it is also important to control carefully certain of the conditions of operation as will be seen from the following paragraphs wherein our preferred method of carrying out the invention to obtain both a high efficiency of adsorption and a high adsorption capacity is described. By efficiency, we mean simply the fraction of the osmium introduced to the bed which is removed from the feed stream in passage through the bed. This is usually expressed as percentage efficiency. Thus, ordinarily, an efficiency of 90% is easily obtainable, and under special conditions a high efficiency of 99.5% or a very high efficiency of 99.9% or more may be obtained. By capacity, we mean simply the amount of a feed stream which may be treated by a bed without serious loss of efficiency. Ordinarily, this is expressed as volumes of feed per bulk volume of the alumina bed and is referred to as a capacity of so many bed volumes. The capacity of a given bed for a given feed is, of course, also influenced by the criterion of efficiency which is established. Thus, a given bed treating a given feed may have a capacity of 100 bed volumes at an overall efficiency of 90%, but only 80 bed volumes at a terminal efficiency (i. e., the efficiency at the time of termination of the adsorption cycle) of 90%, and a capacity of perhaps 70 bed volumes at a terminal efficiency of 99.5%.

Most products of reaction of organic compounds in the presence of osmium compounds contain at least small amounts of organic acids formed as by-products in the reaction. This is almost always the case with the products of oxidizing organic compounds using osmium tetroxide in the process. It has been found that these organic acids are strongly adsorbed by the alumina and, accordingly, the capacity of the alumina to adsorb osmium from these reaction products may well be limited by the amount of acid in the feed rather than by the amount of osmium. For instance, with aqueous oxidation mixtures containing the same amount of osmium compound, one with an acidity of 0.1 normal and the other 0.003 normal, the capacities of the same adsorptive alumina will be 3 and 45 bed volumes, respectively, at the same adsorption efficiency. In view of this fact, it is surprising to find that a highly alkaline alumina is unable to absorb osmium with the highest efficiency and, in fact, succeeds in such highly efficient adsorption only after it has been partly acidified, as by adsorption of acids from the feed. On the other hand, if the entire bed is acidified it is again no longer able to effect efficient removal of osmium. Thus, to obtain the highest efficiency and to have at the same time a high capacity it is required that a bed have within it an acid zone and also to have, in reserve as it were, a considerable zone which is not acid. Within limits, increased alkalinity of this reserve zone serves to increase capacity without impairing efficiency.

Based on these facts, several ways have been devised for further improving the process. For instance, due to the effect of alkalinity in lowering the efficiency of adsorption of osmium compounds, it has been found desirable to treat the aluminas of commerce, which are all quite alkaline, to reduce their alkalinity before they are used in the present process. Boiling the alumina several times with water or acid treatment followed by exhaustive water washing are suitable conditioning methods. A pH of not more than 9, preferably 8 or less, in the wash water indicates a satisfactory reduction of the alkalinity. This usually requires treatment with about 50 volumes of water per bed-volume of alumina. By this treatment the unadsorbed osmium compound in the solution first passing through the alumina bed is reduced to one-tenth or less of that which is lost when ordinary activated alumina of commerce is used. If there is acid in the feed, water washing the alumina may reduce its capacity for adsorbing of osmium compound, but this is usually more than offset by the increased efficiency of adsorption.

Another way of obtaining efficient adsorption of osmium compounds when using a single adsorption bed involves recycle of the initial effluent from the bed. This effluent will contain significant amounts of osmium compound due to the fact that there will be no, or insufficient, acid zone in the bed during the first stages of operation. Once this zone is created as a result of continued passage of organic acid-containing feed through the bed, the initial effluent can be repassed through the bed and efficient removal of the residual osmium compound is obtained.

In general, high efficiency of adsorption of osmium compound on adsorptive alumina can be obtained by arranging the flow so that the feed stock will always contact an acid zone as well as an alkaline zone. Most preferably, the feed stock is first contacted with an acid zone of alumina, e. g. with a bed which has an acid zone at least at its inlet end. One advantageous method for insuring this is to provide a plurality of adsorption beds in series containing varying amounts of adsorbed organic acid. The bed which has most nearly reached its adsorption capacity and contains considerable adsorbed organic acid is used as the first bed of the series, i. e. as the bed which the osmium compound-containing feed first contacts. The first bed is retained in this position until the acid zone has penetrated well into the second bed of the series. The first bed is then removed from the adsorption series for recovery of the adsorbed osmium compound. A fresh or regenerated bed is then added at a later stage in the adsorption series.

The bed removed from the series is then treated for recovery of adsorbed osmium compound by one of the previously described methods. In this case it is desirable to also wash the alumina to remove therefrom at least a part of the adsorbed organic acid before reusing the alumina for further adsorption of osmium compounds. Where alkaline extracting agents are employed for removing the osmium from the alumina, they will generally effect simultaneous removal of sufficient of such organic acids. Otherwise, it is desirable, in order to achieve most efficient adsorption of osmium compounds on reuse of the alumina, to carry out a washing operation to remove organic acids from the alumina before it is reused for further adsorption of osmium compound. Such removal of adsorbed organic acids is usually most advantageously carried out following the osmium removal step. Washing with caustic or other alkaline solution is a preferred way of removing the undesirable adsorbed organic acids from the alumina. The caustic or any other chemical used in treating the alumina is preferably removed from the alumina by a final water wash before the alumina is reused.

To simplify the following more detailed description of the invention as used in accordance with this preferred modification, it will be described as applied to the recovery of osmium compounds from mixtures obtained in carrying out oxidations of organic compounds catalyzed by osmium compounds, typified by the products of hydroxylation of olefinic compounds, particularly allyl alcohol and the like, in aqueous media. This illustration of the invention has been chosen not only because of the practical importance of this field of application of the new process but also because of the special difficulties involved in recovering osmium compounds from this type of product. It will be understood, however, that the invention is not limited to this modification but is broadly applicable to the removal of osmium compounds from their admixtures with organic materials regardless of their source or composition.

The hydroxylation of olefinic compounds by reaction with a hydroxylating agent in the presence of osmium tetroxide as catalyst can be carried out in various ways. One advantageous method is by reaction with peroxides, for instance, tertiary butyl hydroperoxide, peracetic acid, hydrogen peroxide, or the like. The reaction product in such cases is an aqueous mixture comprising the polyhydroxy product of hydroxylation, together with minor amounts of organic by-products of the reaction including carbonylic compounds, some of which are usually carboxylic acids. The mixture will also contain any unreacted starting material, and the catalyst. The catalyst will be, for the most part, in a lower valence state than the starting osmium tetroxide. It usually has been considered to be in the form of osmium dioxide, but, generally, an appreciable portion will be in an organically bound form. Amounts of osmium tetroxide in the order of about 0.0001% to about 1% by weight of the olefinic compound being hydroxylated can be used, although larger amounts may be advantageous under some circumstances. Even with the smallest permissable amounts of this catalyst, it is still desirable for economical operation to recover as much as possible of the osmium for reuse in the hydroxylation. Due to the well known undesirable effects of heavy metals, it is also usually desirable to free the product substantially from osmium compounds. Both of these ends can be accomplished without loss of valuable product by the present process.

The attached drawing illustrates diagrammatically one modification of the invention in which adsorption towers containing activated alumina are used to recover osmium tetroxide catalyst for reuse in hydroxylation. In the drawing, which is not to scale, 1 represents a storage tank for the osmium-containing hydroxylation product to be treated. This product, supplied by line 2 from a source not shown, will contain osmium compounds in a lower valence state than the desired tetroxide. Feed for the catalyst recovery system is withdrawn from tank 1 by line 3 and fed to a header 4 which is connected by lines 5 through 11, respectively, to six port valves 12 through 18. Each of these valves is connected by lines 19 through 25, respectively, to adsorption towers 26 through 32. Each adsorption tower contains a bed of adsorptive alumina particles. Outlet lines 33 through 39, at the bottom of the adsorption towers, connect the towers respectively with five port valves 40 through 46.

Inlet lines 48 through 54 connect valves 12 through 18, respectively, with a header 47 supplied with wash water which is preferably deionized to avoid unnecessary contamination of the alumina. Valves 12 through 18 are also connected by lines 56 through 62, respectively, to a header 55 which supplies a suitable oxidizing solvent for the adsorbed osmium compound, for instance, aqueous hydrogen peroxide. Another header 63 connected with a supply of alkaline solution, for example, aqueous caustic soda solution, is joined by feed lines 64 through 70, respectively, with valves 12 through 18.

Inlet lines 71 through 77 to valves 12 through 18 are connected, respectively, to outlet lines 78 through 84 of valves 40 through 46 so that solution can flow from one adsorption tower to the next tower of the series on proper adjustment of these valves. Outlet lines 85 through 91 of valves 40 through 46, respectively, are provided so that effluent from towers 26 through 32 can be fed to header 92. Another set of outlets 93 through 99 are provided for connecting these valves, respectively, to header 100, while outlets 101 through 107, respectively, connect valves 40 through 46 with header 108.

Header 92 is connected to tank 109 in which the hydroxylation product freed from osmium compounds can be stored. The solution of recovered osmium compounds extracted from the alumina is collected in tank 110, fed by header 100. From tank 110 the extracted osmium compounds can be withdrawn by line 111 for reuse in the hydroxylation reaction either directly or after suitable treatment depending on the nature of the extracting agent used. The products from the alkaline washing of the alumina are collected in tank 112 supplied by header 108. When any appreciable amount of osmium compound is present in the products of the alkaline wash, it can be recovered by treating the extract in mixer 114 fed by line 113 with acid, for example, 60% to 98% sulfuric acid, supplied by line 115. The acid mixture is withdrawn by line 116 to stripping tower 117 to which steam is supplied by line 118, while a suitable oxidizing agent, for instance, aqueous hydrogen peroxide solution, is fed near the top by line 119. Osmium tetroxide is taken off overhead with steam, and remaining higher boiling components are withdrawn by line 120 to storage tank 121. The osmium tetroxide-containing vapors are condensed in condenser 123 through which a suitable cooling medium is circulated by lines 124 and 125. The condensate is collected in accumulator 127 from which osmium tetroxide solution suitable for reuse in the process is withdrawn by line 128. Uncondensed vapors are taken off by line 129 and fed to scrubber 130 to which alkaline solution, for instance, caustic soda solution, is suppled by line 131. Extracted osmium compounds are withdrawn by line 132 and returned to tank 113, while vent gases are discharged by line 133.

The setting of the valves in one cycle of operation in which the first two adsorption units are being used to remove osmium compounds from the hydrolysis product is indicated in the drawing by dotted lines in the fourteen valves. At this stage of operation the osmium-containing feed solution from tank 1, preferably cooled by means not shown to about 50° F. to 70° F., flows by line 3, header 4, line 5, valve 12 and line 19 into adsorption tower 26 where it contacts adsorptive alumina which had already been in use as the second stage of adsorption in the previous operating cycle in which the first adsorption stage was carried out in tower 32. The solution which is preferably fed at the rate of about 1 to about 500, most preferably about 10 to about 50, volumes per hour of alumina per bed passes out of tower 26 through line 33 and valve 40 into line 78 and flows by line 72, valve 13 and line 20 into tower 27 whose regeneration had been completed in the preceding cycle. The organic material freed of osmium compounds is withdrawn from tower 27 by line 34 and passes via valve 41 and lines 86 and 92 to tank 109. Simultaneously, tower 32, which in the previous cycle had been in use as the first adsorption stage, is washed with a suitable solvent to recover organic product remaining therein after completion of the adsorption of osmium compounds. This washing treatment is shown in the drawing as being carried out with water for the recovery of water-soluble hydroxylation products. Where water-insoluble products are involved, other solvents such as hydrocarbons, ethers or the like can be similarly used. The wash water supplied from header 47 is fed by line 54, valve 18 and line 25 to tower 32, and the solvent with the extracted product is removed by line 39, valve 46 and line 91 and conducted by line 92 to tank 109 for admixture with the previously recovered osmium compound-free product. At the same time, tower 31, which in the previous cycle had been undergoing this same water-washing treatment, is extracted with a solvent to remove the adsorbed osmium compounds. In the present case, aqueous hydrogen peroxide of about 0.5% concentration from header 55 is supplied by line 61, valve 17 and line 24. The extracted osmium compound is taken off by line 38, valve 45 and lines 98 and 100, and collected in tank 110.

Tower 30, from which adsorbed osmium compounds had been removed in the same way in the immediately preceding cycle of operation, is washed out with water from header 47 to remove the oxidizing solvent (hydrogen peroxide solution in the present case). The wash water is supplied by line 52 through valve 16 and line 23, and is removed by line 37, valve 44 and line 97. Since this wash water will usually contain a small amount of osmium compound, it is conducted by line 100 to tank 110.

At the same time the alumina in tower 29 is treated with an alkaline solution to remove acidic materials which have been found to interfere with the adsorption of osmium compounds from organic material-containing feed mixtures. In the cycle immediately preceding, this tower had been given the water wash described above in connection with tower 30. The alkaline treatment, in the present instance extraction with aqueous sodium hydroxide solution of about 1% to 10% concentration, for example, is fed from header 63 by line 67, valve 15 and line 22. The spent caustic with extracted acids is withdrawn by line 36, valve 43 and lines 104 and 108 to tank 112. Any extractable osmium compounds remaining on the alumina at this stage will be removed and can be converted to osmium tetroxide by treatment in units 114 and 117, as previously indicated.

Tower 28, which was given the foregoing caustic extraction in the immediately preceding cycle, is water washed with water from header 47 fed by line 50, valve 14 and line 21. The wash water is removed by line 35, valve 42 and line 103 and conveyed by line 108 to tank 112 for admixture with the alkaline extract. This treatment puts the alumina in tower 28 in condition to again serve as adsorbent for osmium compounds.

In the succeeding cycle of operation, the valves are shifted and feed from tank 1 is fed to tower 27 and then to tower 28. Tower 26 is put on product extraction with water, while tower 32 is treated with aqueous hydrogen peroxide to remove adsorbed osmium compounds from the alumina. Tower 31 is water washed to remove hydrogen peroxide and tower 30 is treated with caustic solution to remove acids, while caustic-treated tower 29 is water washed. In this way each tower goes successively through each stage of the cycle, and osmium compounds are efficiently removed and recovered with negligible loss.

It will be understood that while, for the sake of clarity, each of these regeneration treatments have been shown as taking place simultaneously in a different tower, this is not essential. Since the adsorption stage of the cycle is usually much longer than any of the regeneration treatments, it will generally be feasible to operate with only one or two beds under regeneration at one time.

When operating in this manner with a reaction product from the hydroxylation of allyl alcohol with hydrogen peroxide in the presence of osmium tetroxide catalyst and consisting of an aqueous solution of approximately 20% organic material, chiefly glycerine, and containing organic acids corresponding to about 0.003 N acidity and 0.0070% of osmium compounds of lower valence than the tetroxide, it was found that 99.95% of the osmium was removed on a bed of Alorco F–1 alumina of 40–70 mesh at an average residence time of about 3.6 minutes. The adsorbed osmium compounds were removed by washing with 5 to 10 bed-volumes of 2% hydrogen peroxide, after which washing with 5 to 10 bed-volumes of 5% caustic soda solution restored the columns essentially to their original efficiency. With alumina beds 20 inches deep, the alumina has a capacity of about 120–150 volumes of reaction mixture per volume of alumina.

In the same way, catalyst has been successfully removed from glyceraldehyde produced by hydroxylating acrolein with hydrogen peroxide, using osmium tetroxide as catalyst in a concentration of about 0.04% in the aqueous reaction mixture.

Instead of depending solely upon adsorption on alumina for the separation of osmium compounds from aqueous mixtures of organic compounds, the alumina can be used in combination with other methods of recovery. For instance, the bulk of the osmium compounds can be adsorbed on alumina as previously described and the remainder can be recovered by adsorption on a basic ion exchange resin or by other means. While only one tower is shown in the drawing as being used in each of the extraction and washing stages, it will be understood that these operations can be carried out with a plurality of stages connected in series or parallel. Instead of collecting the various washing solutions in admixture with their respective extracts, it is sometimes advantageous to collect one or more of these solutions separately in order to avoid unnecessary dilution of the more concentrated extracts. Still other variations can be made in the invention which is not limited to the methods of operation which have been described by way of illustration nor by any theory proposed in explanation of the improved results which are obtained.

We claim as our invention:

1. In a process for carrying out the osmium tetroxide catalyzed oxidation of an ethylenic compound with a peroxide in which an equeous solution containing the organic reaction product together with used catalyst is obtained, the method of recovering catalyst from said solution without substantial loss of the desired organic reaction product present therewith in the solution which comprises contacting said aqueous solution with activated alumina containing adsorbed organic acid, drawing off aqueous solution of said organic reaction product from the alumina containing adsorbed used catalyst thereon, and extracting said catalyst from the separated alumina for reuse in said oxidation.

2. A process in accordance with claim 1 wherein the aqueous mixture is passed through a bed of granular activated alumina and the bed is subsequently washed with a solution of an oxidizing agent and osmium tetroxide is recovered.

3. A process in accordance with claim 2 wherein the washed alumina is further treated with an aqueous solution of a basic agent, water washed to remove base therefrom and again contacted with the aqueous reaction mixture being treated.

4. In a process for producing glycerine by reacting allyl alcohol with an aqueous solution of a peroxide in the presence of osmium tetroxide as catalyst in which an aqueous solution containing glycerine and used catalyst is obtained, the method of recovering catalyst from said solution without substantial loss of glycerine which comprises contacting said aqueous solution with activated alumina having adsorbed organic acid thereon, drawing off substantially catalyst-free glycerine solution from the alumina containing adsorbed used catalyst, extracting the separated alumina with a solvent for the adsorbed catalyst thereon, and returning recovered catalyst to the reaction with allyl alcohol.

5. A process for recovering catalyst from the products of osmium tetroxide-catalyzed oxidation of an ethylenic compound with a peroxide which comprises passing the catalyst-containing organic oxidation product through a bed of granular activated alumina having an acid zone at least at the inlet, withdrawing from the bed oxidation product free from catalyst, extracting adsorbed catalyst from the alumina with an aqueous hydrogen peroxide solution, and returning the recovered catalyst to the oxidation.

6. In a process for producing glycerine by hydroxylating allyl alcohol with aqueous hydrogen peroxide under the catalytic influence of osmium tetroxide, the method of recovering the catalyst which comprises passing the reacted mixture through a bed of granular activated alumina having an acid zone at least at the inlet, water-washing the alumina, extracting the alumina with an aqueous solution of an oxidizing agent capable of converting the adsorbed catalyst to osmium tetroxide, and returning the thus recovered osmium tetroxide to the hydroxylation.

7. In a process of reacting an ethylenic compound with a peroxide oxidizing agent under the catalytic influence of osmium tetroxide, the method of recovering said catalyst for reuse in the oxidation which comprises first contacting the reacted mixture with activated alumina containing adsorbed organic acid to effect adsorption of catalyst thereon, subsequently extracting the alumina with an aqueous solution of an inorganic base reactive with the adsorbed osmium compound to remove said adsorbed compound from the alumina, acidifying the extract and distilling in the presence of an oxidizing agent to recover osmium terroxide therefrom.

8. A process in accordance with claim 7 wherein the alumina is extracted with an aqueous solution of an oxidizing agent for the adsorbed osmium compound prior to said extraction with an inorganic base.

9. In a process of hydroxylating an ethylenic compound by reaction with aqueous hydrogen peroxide under the catalytic influence of osmium tetroxide, the method of recovering used catalyst which comprises passing the aqueous reaction mixture through a plurality of beds of activated alumina until an acid zone has developed in the second bed through adsorption of organic acids present in the feed, then removing the first bed from the series, contacting the fresh reaction mixture with said second bed, using as the second bed in the new series a bed of activated alumina in which the alkalinity has been reduced by adsorption of organic acid so that water in contact therewith has a pH of not more than 9, extracting the alumina bed removed from the adsorption cycle to remove used catalyst adsorbed thereon and returning recovered catalyst to the hydroxylation.

References Cited in the file of this patent

UNITED STATES PATENTS

| | | |
|---|---|---|
| 2,015,593 | Derr | Sept. 24, 1935 |
| 2,331,292 | Archibald et al. | Oct. 12, 1943 |
| 2,371,119 | Nachod | Mar. 6, 1945 |
| 2,500,599 | Bersteinsson et al. | Mar. 14, 1950 |
| 2,610,907 | Stein et al. | Sept. 16, 1952 |
| 2,613,223 | Young | Oct. 7, 1952 |

OTHER REFERENCES

Kunin et al.: Ion Exchange Resins; Wiley & Sons, N. Y., 1950; pages 9, 10, 38, 66–70, and 97.

Baker: "Sorption of Anions by Hydrous Alumina"; New York City, 1940 (22 pages).

Milas: J. A. C. S., vol. 59 (1937), pp. 2342–5.

Kunin et al.: Ion Exchange Resins, supra, as text.